July 9, 1946.  L. M. POTTS  2,403,682

MECHANICAL CIPHERING SYSTEM

Original Filed Oct. 19, 1942  8 Sheets-Sheet 1

INVENTOR
LOUIS M. POTTS

BY
*J. B. Whitfield*
ATTORNEY

July 9, 1946.   L. M. POTTS   2,403,682
MECHANICAL CIPHERING SYSTEM
Original Filed Oct. 19, 1942    8 Sheets-Sheet 2

INVENTOR
LOUIS M. POTTS
BY
ATTORNEY

FIG. 5

INVENTOR
LOUIS M. POTTS
BY
J.H.B. Whitfield
ATTORNEY

July 9, 1946.　　　　　L. M. POTTS　　　　　2,403,682

MECHANICAL CIPHERING SYSTEM

Original Filed Oct. 19, 1942　　　8 Sheets-Sheet 4

INVENTOR
LOUIS M. POTTS
BY
ATTORNEY

July 9, 1946.  L. M. POTTS  2,403,682
MECHANICAL CIPHERING SYSTEM
Original Filed Oct. 19, 1942  8 Sheets-Sheet 6

INVENTOR
LOUIS M. POTTS
BY J. H. B. Whitfield
ATTORNEY

July 9, 1946.  L. M. POTTS  2,403,682
MECHANICAL CIPHERING SYSTEM
Original Filed Oct. 19, 1942   8 Sheets-Sheet 7

FIG. 16

INVENTOR
LOUIS M. POTTS
BY
ATTORNEY

Patented July 9, 1946

2,403,682

UNITED STATES PATENT OFFICE 2,403,682

MECHANICAL CIPHERING SYSTEM

Louis M. Potts, Evanston, Ill., assignor to Teletype Corporation, Chicago, Ill., a corporation of Delaware Original application October 19, 1942, Serial No. 462,522. Divided and this application September 18, 1944, Serial No. 554,637

2 Claims. (Cl. 178—71)

This invention pertains to printing telegraph systems and particularly to a system for the transmission and reception of secret telegraph messages.

This application is a division of copending application Serial No. 462,522, filed October 19, 1942.

Secret signalling systems are desirable for naval, military and civil purposes wherein it is necessary that certain messages be rendered uninterceptible by unauthorized persons. The surreptitious interception of messages by unauthorized persons might be accomplished, for example, in the case of wire communication by tapping signal wires or in the case of radio transmission by receiving apparatuses tuned to the proper frequencies.

It has been proposed as exemplified by the G. S. Vernam Patent No. 1,310,719, dated July 22, 1919, to provide a system for sending enciphered messages in which the five unit Baudot code is employed. In general, the ciphering system described in the Vernam patent utilizes an arrangement wherein one set of five contacts are controlled by either enciphered or original signals and a second set of five contacts are controlled by key signals provided through the instrumentality of a key tape. The two sets of contacts are operated in synchronism to control jointly a set of five relays in order to encipher or decipher messages according to the direction of transmission.

As is well known in the printing telegraph art the individual code combinations of the five unit Baudot code are made up of a series of marking and spacing impulses which are customarily in the form of current impulses representative of marking conditions and no current impulses representative of spacing conditions. In start-stop telegraphy which is herein employed the five unit code is preceded by a start or spacing impulse and followed by a stop or marking impulse.

In order to encipher messages by the system of the present invention the elements of the original code combination are combined with the elements of code combinations provided by a key tape. In this arrangement opposite conditions, that is, with one element of the original code combination marking and with one element of the key code combination spacing, produce a marking signal. Like conditions, however, that is with both elements marking or both elements spacing, produce spacing signals. This presumes, of course, that each of the elements of the respective code combinations are related to each other. Thus the No. 1 element of the original code combination is combined with the No. 1 element of the key code combination, etc. To take a specific illustration let it be assumed that it is desired to encipher the letter "R" which in the Baudot code is composed consecutively of spacing, marking, spacing, marking, and spacing conditions. Let it be further assumed that the key tape with which the particular enciphering operation is to be performed occupies a position whereat it is conditioned for producing the letter "Y" combination which in the Baudot code is composed consecutively of marking, spacing, marking, spacing, and marking conditions. Under these assumed conditions the enciphering operation would result in the production of an all-marking or "letters" combination since in this case opposite conditions of all the elements of the "R" and "Y" code combinations are provided. This will be readily apparent from the following chart wherein the letter M indicates a marking condition and the letter S indicates a spacing condition.

|  | 1 | 2 | 3 | 4 | 5 |
|---|---|---|---|---|---|
| Original signal "R" | S | M | S | M | S |
| Key signal "Y" | M | S | M | S | M |
| Resultant enciphered signal, "letters" | M | M | M | M | M |

It is to be understood that both the transmitting and receiving ends of a telegraph line will be equipped with identical key tapes, which during message transmission will occupy identical positions during each signal interval. A station which receives enciphered signals is thus enabled to decipher the unintelligible signals transmitted over the telegraph line by combining the enciphered signals with the key signals provided by its key tape. To illustrate a deciphering operation the example given above in connection with the enciphering operation will be continued and it will be assumed that a receiving station received the enciphered signal; namely, "letters." The "Y" combination provided by the key tape at the receiving station can now be combined with the "letters" combination to decipher the enciphered signal to thereby reproduce the original signal "R" as clearly shown in the following chart.

|  | 1 | 2 | 3 | 4 | 5 |
|---|---|---|---|---|---|
| Enciphered signal, "letters" | M | M | M | M | M |
| Key signal "Y" | M | S | M | S | M |
| Original signal "R" | S | M | S | M | S |

The use of mechanically controlled and operated signalling arrangements have demonstrated advantages not obtainable in systems which are for the most part electrically controlled. Electrically controlled systems which usually include receiving and transmitting commutator distributors and relay controlled contact arrangements, while advantageous for certain requirements, do not operate with the efficiency and comparatively slight maintenance afforded in mechanical systems. A mechanical enciphering arrangement employing permutation code combinations with its attendant advantages over electrically controlled systems has thus far not been proposed. Mechanical enciphering systems are particularly desirable for the transmission of secret messages wherein it is advisable that signal distortion be kept to a minimum and that maintenance troubles do not delay communicating operations.

Accordingly the primary object of the present invention is the provision of a simple, reliable and practical system and apparatus for rendering messages unintelligible to unauthorized persons.

Another object of the invention is to provide a system and apparatus for precluding the unauthorized interception of messages by mechanical operations established in response to the respective control conditions.

A further object of the invention is the provision of a portable mechanically operated ciphering unit which may be readily associated with standard printing telegraph apparatus used for telegraphic communication.

A feature of this invention is the employment of directional switching means for automatically conditioning a ciphering unit for either enciphering or deciphering operations dependent upon the direction of transmission.

An additional feature of the present invention is the provision of a mechanical enciphering unit in the form of a regenerative repeater.

Other features and advantages of the invention will appear as the description progresses and accordingly the invention should not be limited by the specific recitals appearing above.

The invention herein described utilizes a portable mechanical ciphering unit in the form of a regenerative repeater resembling the regenerative repeater illustrated in Patent No. 2,105,173 to W. J. Zenner et al., dated January 11, 1938. The unit includes a signal transmitting contact lever operable sequentially by a series of selector bars in accordance with the joint control exercised over the bars by a series of levers which may be under the direct control of a key tape or in a modification of the invention under the control of a set of five code magnets and a single armature lever controlled by a selector magnet which may respond to either enciphered or deciphered signals. It is understood, of course, that other equivalent means of control may be employed.

The proposed construction includes a complete circuit system for operation of the unit which controls directional switching means for automatically enciphering or deciphering messages dependent on the direction of transmission. In one form of the invention a direction switch bar is employed which is operated either to one of two positions depending on the direction of the signals. The second form of directional switching employed features the use of a contact operating lever having a pair of transmitting contacts and a switching system which renders one or the other of the contacts effective for transmission according to the direction of signalling.

All necessary equipment for the ciphering unit will be contained in a small portable receptacle that may be conveniently carried for use at locations having standard printing telegraph apparatus. A set of plugs are included with the unit to enable the unit to be quickly and easily associated with standard telegraph apparatus.

The invention may be more readily understood from the following detailed description and the drawings wherein.

Figures 1, 2:
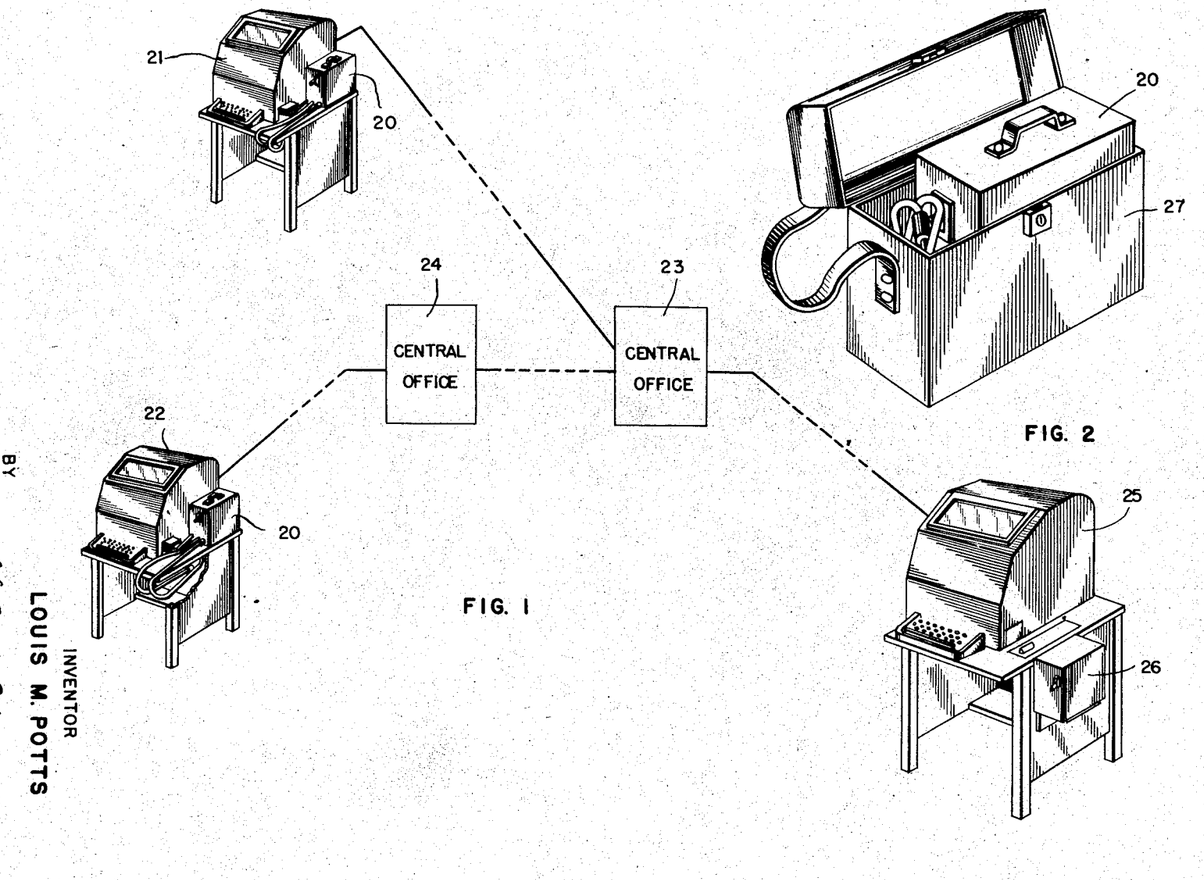
Fig. 1 is a simplified diagram of two outlying stations associated with central office exchanges.
Fig. 2 is an illustration of a portable ciphering unit embodied in the present invention included in a carrying case.

Referring now to the diagram shown in Fig. 1 there is pictorially illustrated portable ciphering units 20 shown in enlargement in Fig. 2 which may by plug connections, be readily associated with standard printing telegraph units 21 and 22 which are respectively connected with central telegraph offices or exchanges 23 and 24. At the central office 23 there may be provided a printing telegraph unit 25 with which there is permanently associated a ciphering unit 26. This illustration is, of course, merely exemplary however and instead of being connected in an exchange, the units 21 and 22 may if desired be connected directly or permanently to each other. The portable unit 20 may be readily carried in its carrying case 27 so that the unit may be conveniently used at different locations, where standard printing telegraph apparatus is available.

Figure 5:
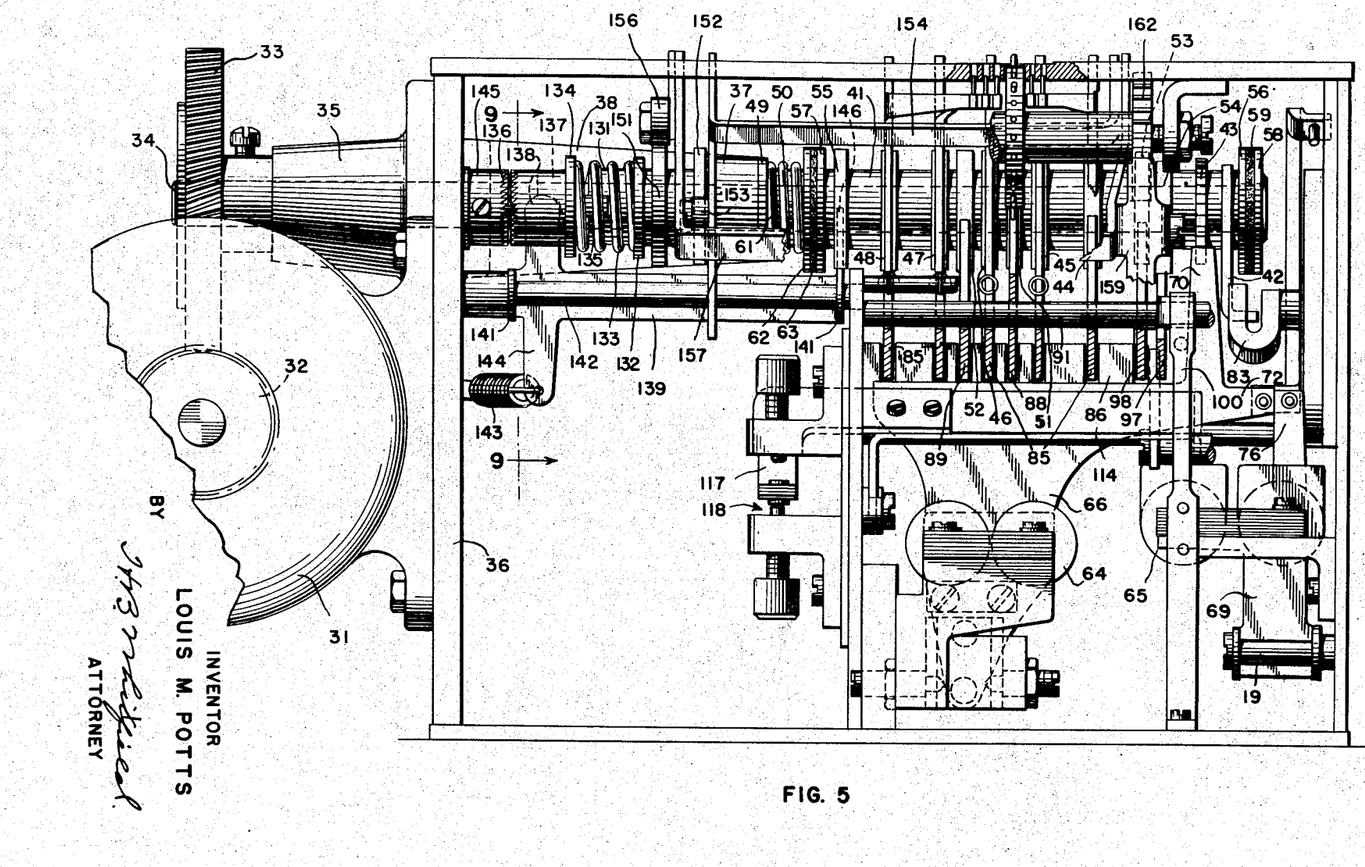
Fig. 5 is an end elevational view of the apparatus shown in Fig. 3.

By reference to the drawings, the main embodiment of the invention will now be described in detail. In Fig. 5 is illustrated a motor 31 which by gear 32 drives gear 33 to which there is fixedly secured a relatively long operating shaft 34. The shaft 34 is journalled at one end in a bearing 35 which is fitted in a frame 36. A bearing 37 carried by bracket 38 attached to the frame 36 also supports the shaft 34. A cam sleeve 41 freely mounted about shaft 34 has assembled upon it a stop arm 42, a flutter cam 43 and code bar operation cams 44 to 48 inclusive. Also carried by cam sleeve 41 is start bar cam 51 and stop bar cam 52. In addition thereto cam sleeve 41 carries direction control bar cams 53 and 54 best illustrated in Fig. 6 and a clutch release cam 55. The right-hand end of cam sleeve 41 as viewed in Fig. 5 consists of an integral disc flange 56 and the opposite end of the sleeve supports a flange 57 threaded thereon. At the corresponding end of shaft 34 is fixedly secured a flange disc 58. Between flanges 56 and 58 is positioned a felt friction member 59. At the intermediate portion of shaft 34 a sleeve 61 which carries a flanged portion 62 is mounted for a slidable movement by means of a splined connection with adjustable nut 49. Interposed between flange discs 62 and 57 is a friction felt member 63. Secured to the shaft 34 is the adjustable nut 49 which bears against a compression spring 50 to urge the spring against the flange disc 62 thus to urge the entire sleeve 41 to the right as viewed in Fig. 5.

Figure 3:
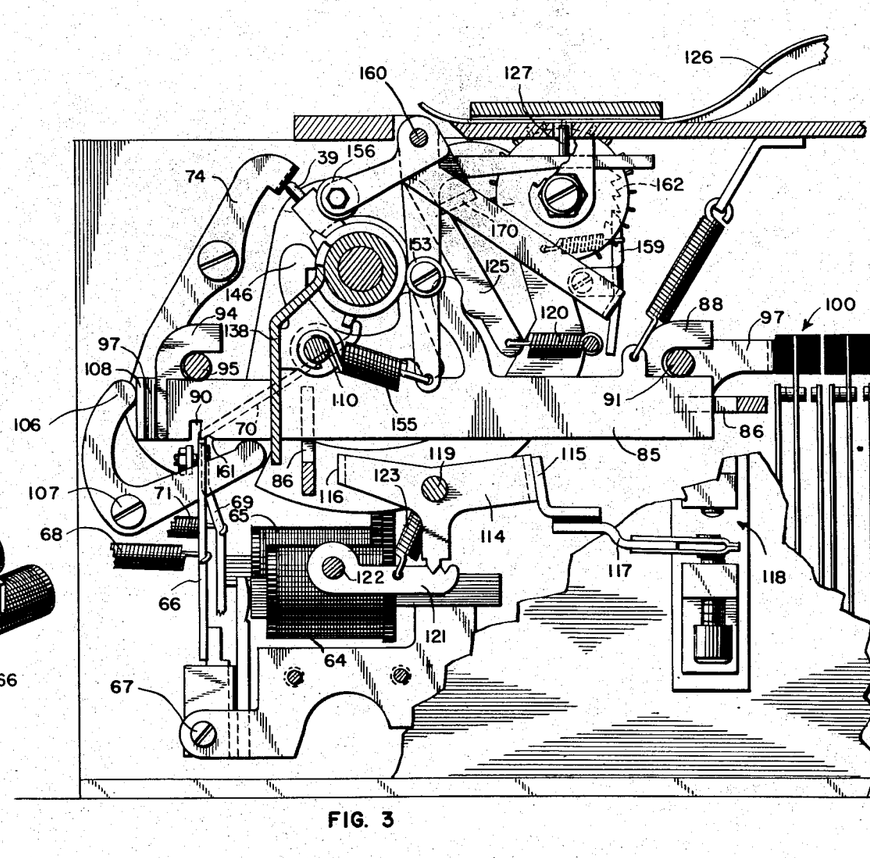
Fig. 3 is a front elevational view of the main embodiment of the invention, partly in section and partly broken away for the sake of clarity.
Figure 4:
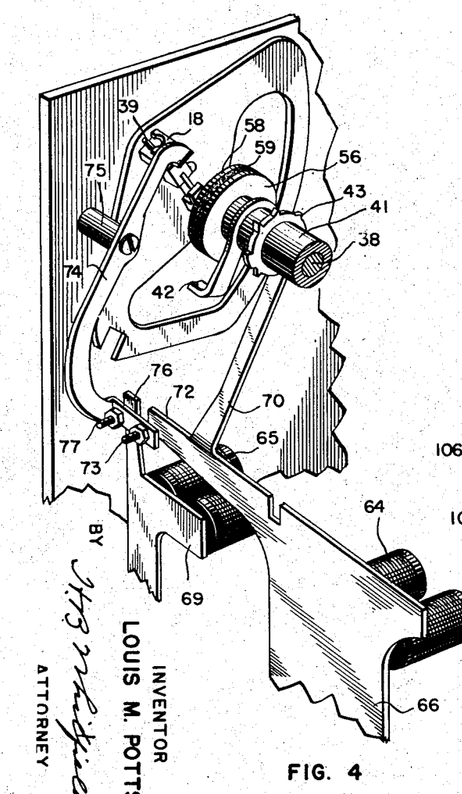
Fig. 4 is a fragmentary perspective view of a portion of the starting mechanism embodied in the present invention.
Figure 8:
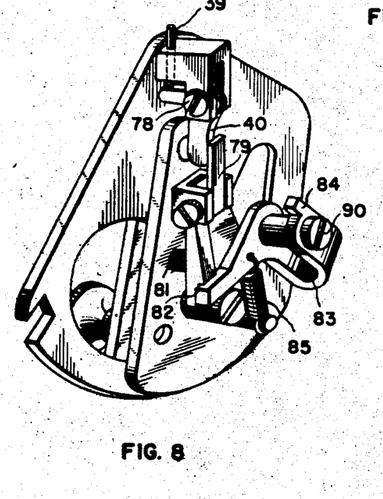
Fig. 8 is a detailed view of a portion of the starting mechanism, another view of which is shown in Fig. 4.

In Figs. 4 and 8 the start mechanism is illustrated which permits the rotation of the cam sleeve 41 through the slip friction clutch arrangement provided by the friction felt members 59 and 63. As is well known in the printing telegraph art, cam sleeve 41 is released for rotation upon the reception of the start impulse which precedes the five unit code combination and is stopped upon receipt of the stop impulse which is received after the completion of the five unit code combination. As will be further described in detail either a selector magnet 64 (Fig. 4) or a start magnet 65 may receive the start impulse in order to release the cam sleeve 41. According to Fig. 3 armature lever 66 of selector magnet 64 is pivoted about shaft 67 and is urged in counterclockwise direction by a spring 68. Armature lever 69 associated with the start magnet 65 is pivoted about shaft 19 (Fig. 5) and likewise normally is urged in a counterclockwise direction as viewed in Fig. 3 by a spring 71. Armature lever 66 carries a laterally extending projection 72 (Fig. 4) engageable with an adjustable screw 73 of stop lever 74, which is pivoted about the stud 75, upon deenergization of selector magnet 64. Likewise armature lever 69 associated with start magnet 65 carries a vertically extending portion 76, which engages an adjustable screw 77 mounted on the stop arm 74. It is, therefore, obvious that deenergization of either magnet 64 or 65 may cause a clockwise movement of the stop arm 74 as viewed in Fig. 4.

Clockwise pivotal movement of stop lever 74 will cause its projection 18 to bear against a pin member 39 to operate a bell crank 40 (Fig. 8) which is pivoted at 78 to thereby cause clockwise pivotal movement of lever 79 against the influence of its compression spring 81. At its lower end lever 79 has a notch 82 which in the stop position of the apparatus locks a gate latch 83 pivoted at 90. Latch 83 carries a notched portion 84 which is normally in blocking relationship with the aforementioned stop arm 42 which is fixedly secured to the cam sleeve 41. When the above described operation takes place, the notch 82 of lever 79 moves out of the path of gate latch 83 and the stop arm 84 is now enabled to overcome the force of a spring 85 associated with the gate latch due to the greater force exerted against the notch 84 by the stop arm 42. The cam sleeve is thus enabled to make a single revolution and to be again stopped when the stop arm once more abuts against the notch 84 of the gate latch 83.

Figures 9, 10, 11, 12, 13, 14, 18:
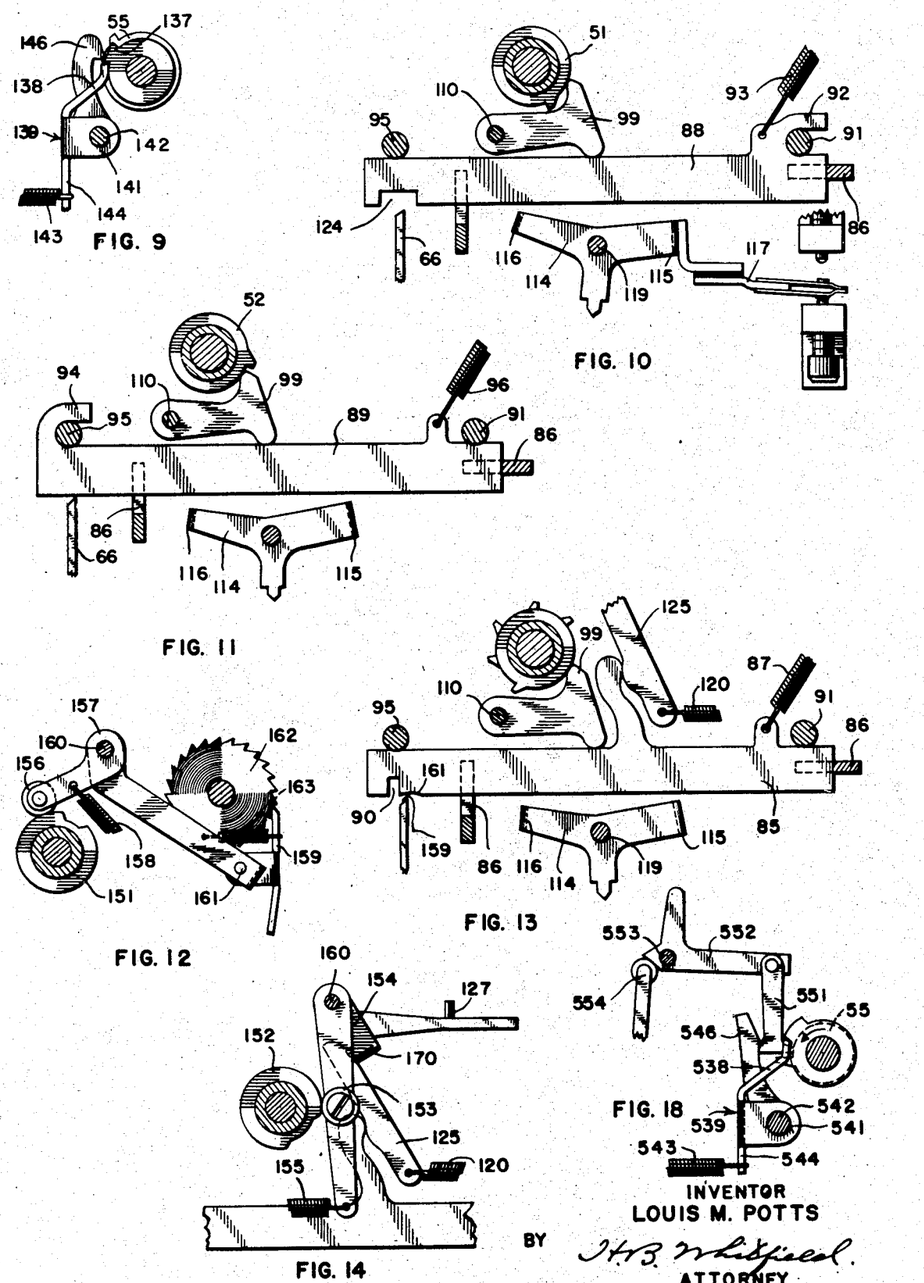
Fig. 9 is a sectional view of the clutch release bail, taken on line 9—9 of Fig. 5.
Fig. 10 is a detailed view of the start bar operating mechanism.
Fig. 11 is a detailed view of the stop bar operating mechanism.
Fig. 12 is a fragmentary view of the tape feeding mechanism.
Fig. 13 is a view illustrating the operation of a code bar.
Fig. 14 is a detailed view of the tape feeler bail.
Fig. 18 is an alternate form of clutch release mechanism.

Positioned below the cam sleeve 41 is a series of five code bars 85 which are mounted for slidable and pivotal movement within the comb members 86. A series of springs 87 normally urge their associated code bars 85 upward and to the right-hand position as clearly illustrated in Fig. 13. The comb members 86 have also mounted therein a start bar 88 and a stop bar 89 (Figs. 5, 10, and 11). The start bar 88 is mounted for counterclockwise pivotal movements as viewed in Fig. 10 about the post 91 and is provided with a bifurcated portion 92 for engagement with the post 91. The bar 88 is normally urged in a clockwise direction about pivot 91 by a spring 93. The stop bar 89 is arranged for clockwise pivotal movement, as illustrated in Fig. 11 about its associated bifurcated portion 94 which engages post 95. A spring 96 normally urges the stop bar 89 in a counterclockwise direction.

Figure 6:
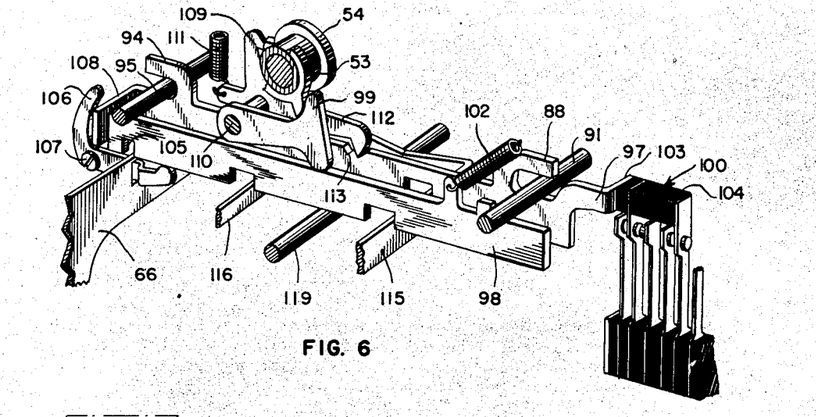
Fig. 6 is a detailed perspective view of a direction switch used in connection with the invention.

In addition to the code bars 85, the start bar 88 and the stop bar 89, the comb members 86 also mount a direction switch bar 97 and a direction control bar 98 best illustrated in Fig. 6. The code bars 85, the start bar 88, the stop 89, and the control bar 98 are all operable by associated T-shaped operating levers 99 which are pivoted about shaft 110 and controlled by their respective cams. The upper portion of each T-lever is in engagement with its associated cam and the lower portion of each lever is in bearing engagement with its associated bar.

The purpose of the direction bar 97 (Fig. 6) is to condition the direction switch 100 according to the direction of transmission. When the switch 100 occupies its normal position to the left, it is in position to control the enciphering and retransmission of outgoing messages originating at the station whereat the ciphering unit is located, whereas when it is moved to the right it is in a position to control the deciphering of incoming messages. The control bar 98 normally is urged to the right and in an upward direction by spring 102 and the bar 98 may pivot in either a clockwise or a counterclockwise direction as will immediately hereinafter appear. The resiliency of the contact springs associated with the direction switch 100 suffices normally to urge the direction bar 97 to the left or transmitting position due to the engagement of the lateral projection 103 with the insulating portion 104 of the direction switch.

When signals are outgoing from the associated station apparatus, the selector magnet 64 receives a spacing or no-current start impulse therefrom, thereby enabling the armature lever 66 to move away from the selector magnet in a counterclockwise direction as viewed in Fig. 3. When this occurs the upper portion of the armature lever 66 will move from beneath the notch portion 105 of the control bar 98 directly to underlie the lower portion of the control bar. As cam sleeve 41 starts rotation, as previously explained, direction control cam 53 will operate its T-shaped operating lever 99 to move the lever in a clockwise direction as shown in Fig. 6. The lower portion of the T-lever pushes against the control bar 98. Since the upper portion of the armature lever is now in blocking relation with the control bar 98 the control bar will be moved in a clockwise direction as viewed in Fig. 6; that is, the right-hand end of bar 98 will move downwardly. This will have no effect upon the direction switch 100 inasmuch as it is desired at this time to allow the direction switch to remain in its normal transmitting position.

However, when signals are incoming from a remote station, start magnet 65 will receive a start impulse of no-current or spacing nature to set the sleeve 41 into rotation. Under these conditions the selector magnet 64 remains energized and consequently its upper portion continues to underlie the notch 105 of the direction control bar 90. Therefore, when sleeve 41 is released cam 53 operates against its T-lever 99 thereby to tilt the direction control bar 90 in a counterclockwise direction about rod 91 as a fulcrum. When this occurs the control bar strikes the lower arm of a bell crank member 106 which is pivoted at 107, thereby causing the bell crank to rock in a clockwise direction. This causes the vertical arm of the bell crank to engage the bent over flange portion 108 of the direction switch bar 97 thereby shifting the direction switch bar 97 to the right. When this occurs the flange portion 103 of the direction switch bar 97 engages the insulating portion 104 of switch 100 to operate the switch to the right-hand position as shown in Fig. 6. Substantially simultaneously with the operation of cam 53 to depress the lever 99, cam 54 also carried upon sleeve 41 operates to release the bell crank latching lever 109 (Fig. 6) which is pivoted at 110 and is normally urged into operative relationship with the cam by a spring 111. The bell crank 109 has a horizontally extending latching arm 112 having a downwardly projecting point which is adapted to engage notch 113 of the direction switch bar 97 when the switch bar is moved to the right, as just explained. The arm 112 of bell crank 109 therefore is immediately released upon the rotation of the cam sleeve 41 and thus latches the bar 97 in its right-hand position during the reception of incoming signals from the remote station. Near the end of its revolution, cam 54 operates again to move the bell crank 109 in a counterclockwise direction as viewed in Fig. 6 thereby to release the projecting portion 112 from the notch 113 of the direction switch bar 97. The direction switch bar 97 accordingly is shifted to the left under the influence of the contact springs of switch 100, which are in a flexed condition when the switch is positioned to the right.

Positioned below the code bars 85, the start bar 88, and the stop bar 89 is a substantially Y-shaped retransmitting lever 114 (Fig. 3) which has laterally extending projections 115, 116, which underlie all of the just mentioned bars. An insulated contact arm 117 is attached to the projection 115, which operates transmitting contact 118. The Y-shaped lever 114 is pivoted at point 119 and may be moved to either a counterclockwise or clockwise position and be retained in either position by the jockey arm 121 pivoted at 122 and normally urged in a counterclockwise direction (Fig. 3) by a spring 123.

When cam sleeve 41 is started into rotation, the direction switch bar 97 is operated as indicated, and invariably start cam 51 (Fig. 10) operates, by means of its T-shaped operating lever 99, start bar 88 which is rotated in a counterclockwise direction about pivot 91, thereby causing the lower portion of bar 88 to contact the arm 116 of the Y-shaped lever 114 to tilt the Y-shaped lever 114 in a counterclockwise direction whereupon contact arm 117 is operated to its upward or spacing position. The start bar 88 has a comparatively large notch 124 in order to insure that there will be no interference with the upper portion of the selector magnet armature 66.

Code bars 85 (Fig. 13) may be freed to shift to their marking or right position under the influence of springs 87 by means of tape feeler levers 125 in accordance with the permutations sensed in a key tape 126 (Fig. 3) by feeler pins 127 which are carried by the tape feeler levers 125. Tape feeler levers 125 in their non-sensing or clockwise position as viewed in Fig. 13 bear against the projections 110 of the code bars 85 to urge the code bars to the left against the influence of their associated springs 87. The tape feeler levers 125 are pivoted at 160 and are urged in a counterclockwise direction as viewed in Fig. 3 by springs 120 so that when a perforation is sensed by a particular feeler lever its feeler pin may project through the tape due to the force exerted by spring 120.

To control the operation of the key tape mechanism there is provided a second cam sleeve 131 which is mounted upon the shaft 34. Sleeve 131 carries an integral collar 132 against which abuts one end of a compression spring 133, the other end of which is in abutting relationship with a collar 134 of sleeve 135 which has a splined connection with the sleeve 131. Spring 133 tends to urge the collar 134 to the left as clearly illustrated in Fig. 5. The sleeve 135 constitutes the driven portion of a positive clutch indicated generally at 136. The sleeve 135 also carries a cam stopping surface 137 which cooperates with the extension 138 of the clutch release bail 139 which carries outwardly extending pivot arms 141 (Fig. 9) supported on the pivot shaft 142. A spring 143 normally urges the clutch release bail in a clockwise direction as clearly shown in Fig. 9 by its attachment to the tail portion 144 of the bail. The extending arm 138 in the stop position of sleeve 131 is normally in blocking relationship with respect to the stopping cam surface 137 and therefore urges the sleeve 135 to the right as viewed in Fig. 5. This maintains the driven portion 135 of clutch 136 out of engagement with the driving portion 145 of the clutch which is fixedly secured to the shaft 34. Bail 139 also carries a projection 146 for following engagement with cam 55 carried by sleeve 41.

When the sleeve 41 has almost completed its revolution and is about to cause the sending of the stop impulse, as will later appear, cam 55 will function by its engagement with the follower arm 146 to tilt the bail 141 in a counterclockwise direction (as viewed in Fig. 9) to release the projection 138 from the path of the cam stopping surface 137 of the driven sleeve 135 of clutch 136. This enables the spring 133 to shift the clutch member 135 to the left to enable the positive engagement of clutch 136 to release sleeve 131 for rotation. Sleeve 131 carries thereon a tape feed cam 151 and a feeler bail cam 152. As sleeve 131 rotates, feeler bail cam 152 operates to permit a follower 153 of tape feeler bail 154 pivoted at 160 to move in a clockwise direction under the influence of spring 155 as clearly depicted in Fig. 14. This operation removes the feeler pins 127 from the holes of the tape 126 due to the engagement of projection 170 of the feeler bail with feeler levers 125. With the feeler pins 127 momentarily held in this position cam 151 operates against the follower 156 of a tape feed bail 157 pivoted at 147, which under the influence of spring 158 rotates bail 157 in a counterclockwise direction as viewed in Fig. 12. This causes feed pawl 159 which is pivoted to the bail at 161 to advance the feed ratchet 162 one step. Feed pawl 159 is urged against the teeth of the feed ratchet by means of a spring 163.

Cam 151 next acts against the follower 156 to rock bail 157 in a clockwise direction to bring back the stepping pawl 159 in position for the next stepping operation. Immediately after this operation cam 152 operates against the follower 153 of the tape feeler bail 154 to permit the feelers 127 to sense the tape.

An alternate form of clutch release mechanism is shown in Fig. 18, wherein an interponent is provided between the cam 55 and the follower arm 146 of the form of clutch release mechanism shown in Fig. 9. Referring to Fig. 18, the clutch release bail 539 is provided with a pair of pivot arms 541 supported on the pivot shaft 542. A spring 543 normally urges the clutch release bail in a clockwise direction by its attachment to the tail portion 544 of the bail 539. The upwardly extending arm 538 is comparable to arm 138 of the form shown in Fig. 9, and serves to maintain the driven portion of the clutch out of engagement with the driving portion thereof during stop intervals. The bail 539 is also provided with an arm 546, (comparable to arm 146) which in the present instance is not directly cooperable with cam 55, but cooperates therewith through the instrumentality of an interponent 551 depending from a bell crank 552 pivoted at 553. Bell crank 552 is held in its clockwise or counterclockwise position by a detent 554. When bell crank 552 is in its clockwise position (shown in Fig. 18), the interponent 551 is operative between cam 55 and arm 546 to tilt the bail 539 cyclically to effect the release of stop arm 538 to permit engagement of the clutch elements. On the other hand, when the bell crank 552 assumes its counterclockwise position (by manually operating the vertical arm of the bell crank), the interponent 551 will be raised out of cooperative relations with cam 55 and arm 546, thus rendering bail 539 non-operative. In the latter position of the bell crank, the repeating mechanism becomes a plain regenerative repeater by rendering the tape stepping and sensing elements non-operative.

The mechanical ciphering operation of the code bars 85 will now be described. It has been previously mentioned that the present ciphering system was predicated upon the use of combined signals provided by a key tape and a selector magnet in which opposite conditions of the individual elements of the code combination produced marking conditions, while like conditions such as both marking or both spacing produced spacing impulses. With this system in mind the description will proceed. In order to describe this phase of the invention it will be presumed that the cam sleeve 41 has been released for rotation by receipt of the start impulse and that the tape 126 occupies a new position as has just been described above, and that the feeler pins 127 are now conditioned for a sensing operation. If the No. 1 feeler pin of the pins 127 should now be sensing a perforation, its associated feeler lever 125 would be urged in a counterclockwise direction by spring 120. This enables the No. 1 code bar 85 to be pulled to the right as viewed in Figs. 3 and 13 and under the influence of spring 87 due to the removal of the feeler lever from projection 110 of the code bar. This sensing of a perforation indicates a marking condition in the No. 1 element of key tape 126. If the selector magnet 64, which is now receiving its No. 1 impulse, is also marking at this particular time it will have pulled up its armature lever 66 so that the armature lever is in alignment with the notch 90 of the No. 1 selector bar 85, there being a similar notch on all of the other code bars 85. The No. 1 code bar operating cam 44 will at this time operate its T-shaped operating lever 99 to cause the depression and pivotal movement of the No. 1 code bar 85. Since notch 90 is in alignment with the upper portion of armature lever 66 the bar will pivot about the post 91 causing the bar 85 to engage the projection 116 of the Y-shaped lever 114, to tilt the Y-shaped lever 114 in a counterclockwise direction to cause the contact arm 117 to move to its up or spacing position. At this time jockey arm 121 will hold the Y-shaped lever 114 in its selected position. It will be understood however that when the Y-shaped lever 114 has previously been tilted to the desired position it will not need to be again shifted.

It is thus readily apparent from the above description that whenever a tape feeler lever 125 is in its marking position and the selector armature lever is also in its marking position that a spacing signal will be sent by the retransmitting contact arm 117. In response to a spacing condition, the feeler pin 127 will not find a perforation in the tape and, hence, bar 85 will remain in its leftward position, as viewed in Figs. 3 and 13. Also, the selector magnet 65 will be de-energized, and its armature 66 will be biased to its counterclockwise position by spring 68, whereby the notch 90 of bar 85 will be aligned vertically with the free end of armature 66. Thus, it is further apparent that when both the tape feeler lever and its particularly associated code bar are both in the spacing position that a like condition will occur and the contact operating arm 117 will be tilted in a counterclockwise position to its up or spacing position since the upper extremity of armature lever 66 will be opposite a notch 90 of a code bar 85. When, however, opposite conditions exist between the selector lever 66 and a particular code bar 85, the particular code bar will pivot in a clockwise direction due to the blocking condition obtained by the upper extremity of the selector armature lever 66. In other words, under this last mentioned condition, the notch 90 of the particular code bar operated will be offset with respect to the upper extremity of the armature lever 66 so that the upper portion of the lever acts as a fulcrum point, and when the associated T-lever 99 is operated, the particular code bar will pivot in a clockwise direction to engage the projection 115 of Y-shaped lever 114 thereby to position the contact operating arm 117 for a marking operation, unless, of course, it has already assumed such position in a preceding code combination.

The upper portion of selector armature lever 66 is beveled as indicated at 159, Fig. 13, while each code bar 85 has formed thereon a groove 161. This arrangement insures the locking of selector lever 66 during a marking operation when a particular code bar 85 pivots in a clockwise direction, as previously explained, and thus gives the so-called knife edge selection. When a spacing operation takes place, however, the armature lever 66 engages in the notch 90 provided by this particular code bar and is, therefore, restrained from movement so that no special locking means is needed.

After every five unit combination is transmitted, stop cam 52 is invariably effective to send a marking or stop impulse. By reference to Fig. 11 it can be seen that the stop bar 89 has no notches formed therein and that the bar 89 is pivoted about the post 95 at its bifurcation 94. Bar 89 therefore may only rotate in a clockwise direction as shown in Fig. 11. Bar 89 will be invariably operated to tilt the Y-shaped lever 114 in a clockwise direction to condition the contact arm 117 to send a marking impulse, due to the engagement of the stop code bar with the projection 115 of the Y-shaped lever 114.

Selector armature lever 66 is provided with an upstanding follower arm 70 (Fig. 4) which is adapted to engage the flutter cam 43 held by the sleeve 41. Just prior to the beginning of each signal impulse the flutter cam 43 acts to move the armature lever 66 towards the selector magnet 64 to assist operation of the selector magnet when marking impulses are received.

Figure 7:
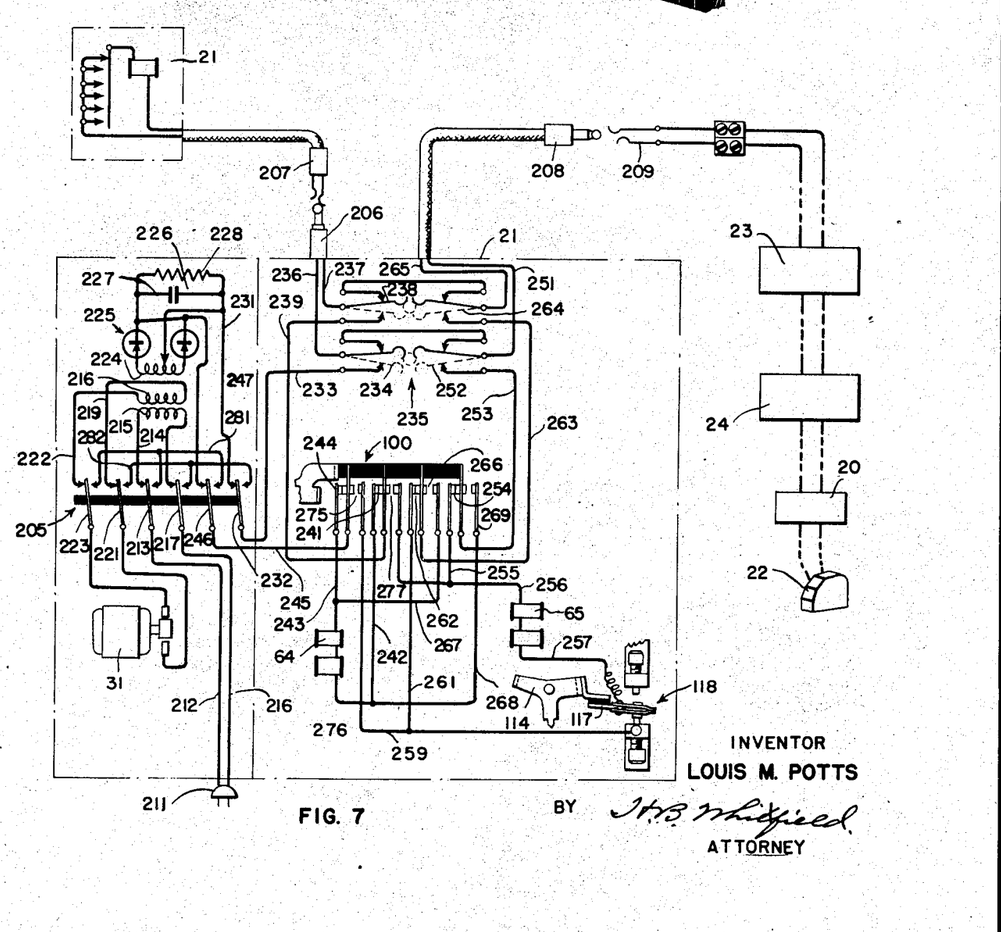
Fig. 7 illustrates the circuit employed in the main embodiment of the invention.

Referring now to Fig. 7, the circuit adapted for use in connection with the just described mechanical ciphering arrangement will now be explained. It will be presumed that station 21 desires to communicate with a distant station 22 connected respectively to central exchanges 23 and 24 as also shown in Fig. 1. The distant station 22, of course, will be provided with a mechanical ciphering unit similar to the one which has just been described. In view of the fact that all locations do not provide both alternating and direct current there is included with the ciphering unit means for providing either A. C. or D. C. current and a manually operated current switch 205 in order to condition the system for operation with either alternating or direct current outlets so that the same unit is suitable for use at any station independent of the kind of current supply. As viewed in Fig. 7, when the switch 205 is positioned to the left it is in its alternating current position, however, when the switch is positioned to the right it is in its direct current position. In order to condition the unit for operation, the operator inserts switch plug 206 into the jack 207 and switch plug 208 into the loop jack 209. The power plug 211 is then plugged into a convenient outlet already present in standard equipment.

For the purpose of the present description it will be presumed that the particular place at which the printer 21 is located is provided with alternating current and therefore the switch 205 will be positioned to the left. With station 21 about to transmit a message to the distant station 22 current now flows over power conductor 212 of plug 211, through contact 213 now in its left-hand position, over conductor 214, winding of coil 215, over conductor 216 through contact 217, over power conductor 216 to the opposite side of plug 211. This induces in the secondary power winding 218 an alternating current for motor 31 as follows: Over conductor 219, through contacts 221, to the motor 31, also over conductor 222, through contacts 223 to the motor 31. The purpose of the secondary coil 216 is to provide a compensating medium for changing from alternating to direct current to maintain a stabilized operating condition of the motor. However, the details of this arrangement need not be described since there are various methods of providing for either alternating or direct current. The energization of coil 215 also excites an additional secondary coil 224 which by means of the rectifier indicated generally at 225 transforms the alternating current into direct current. Associated with the rectifier is a filter indicated generally at 226 which is composed of a conventional arrangement including a condenser 227 and a resistance 228 provided for the purpose of obtaining a steady direct current flow.

With direct current provided as just described, a circuit may be traced from positive lead 231, through contact 232 now in its left position, over conductor 233, through the lower left-hand contact 234 of switch 235, inasmuch as switch 235 has been previously positioned in its downward or enciphering position. The circuit then extends over conductor 236, through plug 206, to station apparatus 21 with a return path over conductor 237, through contact 238, over conductor 239, through contact 241 of direction switch 100 (switch 100 now being in its left-hand position for transmission from its associated local station to the remote station, as previously explained), over conductor 242, through the selector magnet 64, over conductor 243, through contact 244, over conductor 245, through contact 246 of current switch 205, over conductor 247 to negative potential. It is therefore found that under these conditions the selector magnet 64 is energized, and that consequently sleeve 41 of the transmitter unit 21 is held from rotation. At this time there extends also to the ciphering unit a second circuit afforded by the connection of the plug 208 to the jack 209 which is associated with the loop circuit which runs to the central exchange 23. This circuit can now be traced as follows: From one of the potential conductors provided at the central exchange over conductor 251, through the lower right-hand contact 252 of switch 235, over conductor 253, through contact 254 of switch 100, over conductors 255 and 256, through the start magnet 65, over the conductor 257, through retransmitting contact 118, over conductor 259, over conductor 261, through contact 262, over conductor 263, through contact 264 of switch 100, and over conductor 255 to the other conductor provided with opposite potential at the central exchange 20. At this time start magnet 65 is energized.

Thus, when station 21 commences to transmit, each code combination will be preceded with the start impulse to de-energize selector magnet 64 and release the cam sleeve 41 to operate the mechanical ciphering unit as already explained, and also to send a stop or marking impulse at the termination of each code combination to energize selector magnet 64 to stop sleeve 41. The contact arm 117 will therefore be operated to make or break the circuit to the central exchange to transmit, under the control of key tape 126, enciphered signals. It will be understood, of course, that the enciphered signals will be repeated at the central exchange 23 and eventually sent to the distant station 22.

It will now be assumed that the distant station 22 desires to transmit to the local station 21 and it will be particularly pointed out how the direction switch 100 is operated to its opposite position to receive signals from the remote station. The transmitting arm 117 is now in its marking position during a rest period and it will be assumed that a condition is encountered in which the station 22 commences to transmit. When the start impulse is received from the distant station, start magnet 65, which is normally energized in the circuit previously described, will become de-energized and will permit its armature lever 69 shown in Fig. 4, to engage screw 77 of stop arm 74 to release cam sleeve 41 for rotation. Since at this time the selector magnet 64 remains in its energized condition when the T-lever 99 pushes against the control bar 88 by means of the control cam 53, the upper portion of armature lever 66 (not attracted) will underlie the notch 105 of the control bar 98. Therefore, the bar will be enabled to rotate in a counterclockwise direction as viewed in Fig. 6 against the influence of spring 102 due to the clearance provided by notch 105. When this occurs, the direction control bar 98 will engage the horizontally extending portion of bell crank 106 to rotate the bell crank 106 in a clockwise direction to enable its vertically extending arm to engage the bent over flange 108 of the direction switch bar 97 to move the direction switch bar 97 to its right-hand position. When it reaches this position, it is locked up through the action of control cam 54 as explained, for the duration of a signal code combination and is then released. It will thus be seen that during transmission from the distant station, before the receipt of each code combination, the direction switch bar 97 will be operated to its right-hand position.

When the direction switch bar 97 is moved into its right-hand position, several circuits are conditioned by the direction switch 100 to be hereinafter described. To indicate first what actually occurs at this time, it may be generally stated that due to this switching operation, selector magnet 64 is now placed in the loop circuit from the central exchange, over conductors 251 and 265. Also a circuit now is traceable through the local printer 21 by way of the contact operating arm 117. It will thus be obvious that when the incoming enciphered signals (from the remote station) are received by the selector magnet 64, they will be deciphered, and the deciphered signals will be printed as original signals in the printer 21 inasmuch as at this time the contact operating arm 117 is in circuit therewith.

The first circuit, that is, the circuit to the central exchange, will now be traced as follows: Over conductor 265, through contact 264, over conductor 263, through contact 266 (switch 100 now being to the right), over conductor 267, through the winding of selector magnet 64, over conductor 268, through contact 269, over conductor 253, through contact 252, over conductor 251, to the central exchange. The second circuit to be prepared is as follows: From negative potential provided by the local rectifier, over conductor 247, through switch 205 (at contact 246), over conductor 245, through contact 275 (now closed) over conductor 276, over conductor 259, through contact 118 and contact arm 117, over the conductor 257, through start magnet 65, over conductor 256, through contact 277 (now closed), over conductor 239, through contact 238 of switch 235, over conductor 237, through the printer 21, over conductor 236, through contact 234, over conductor 233, through contact 232, and over conductor 231 to positive potential provided by the rectifier 225. It will be readily seen, then, that as incoming enciphered signals are received by the selector magnet 64 they are deciphered, as has already been mentioned, and contact arm 117 operates to make and break the local circuit according to the combined influence of the incoming signals and the key tape signals to control the printer 21 which prints the signals in their original or deciphered condition.

When direct current is available, the following circuit is established when the local station 21 is transmitting to the distant station 22: From power lead 212, through contact arm 213 (swung to its right-hand contact), over conductor 281, through contact tongue 246 (also in its right-hand position), over conductor 245, through contact 244 (now closed, because switch 100 is operated to its left-hand position for transmission from the local station to the remote station), over conductor 243, through winding of selector magnet 64, over conductor 242, through contact 241, over conductor 239, through contact 238 (of switch 235), over conductor 237, through jack 207 and plug 206, through the printer apparatus at station 21, back through plug 206 and jack 207, over conductor 236, through contact 234, over conductor 233, through contact tongue 232 (now engaging its right-hand contact), over conductor 282, through contact tongue 217 (now on its right-hand contact), and then over power lead 218. When signals are being received at the local station 21 it will be understood that direction switch 100 will be positioned to the right and under this condition, direct current will be furnished by the central station 23, through the selector magnet 64, as already explained. Direct current for the motor 31, will be furnished over an obvious circuit, through contact tongues 221 and 223.

General operation

The operation of the main embodiment of the invention will now be explained in a general way. When signals are to be transmitted from the local station to the remote station, the selector magnet 64 of the unit 21 associated with the local station receives the original code signals from the local station. During the reception of the original code signals, the tape feeler levers 125 cooperate with the projections of the code bars 85 to maintain the bars either in their left position as shown in Fig. 13, or to permit them to move to the right position. The tape feeler levers 125 are, of course, under the control of the key tape 126. Therefore, dependent upon the position of notch 96 of a particular code bar 85 with respect to the position of the upper extremity of selector magnet armature lever 66, the code bar is rocked either to a clockwise or counterclockwise position to transmit either a marking or a spacing element to the remote station by means of the retransmitting contact arm 117.

When signals are being transmitted in the opposite direction; that is, from the remote station to the local station, start magnet 65 operates to place the ciphering unit into operation and to shift the switch 100 to its right-hand position as shown in Fig. 7. At this time, selector magnet 64 is placed in circuit with the remote printer and therefore receives enciphered signals under these conditions. The key tape sensing levers 125 now cooperate with the code bars 85 and selector magnet 64 to transmit signals over contact arm 117 in regenerative repeater fashion to the local station inasmuch as at this time a local circuit is made through the contact arm 117 at the local station 21.

Modification

Figure 15:
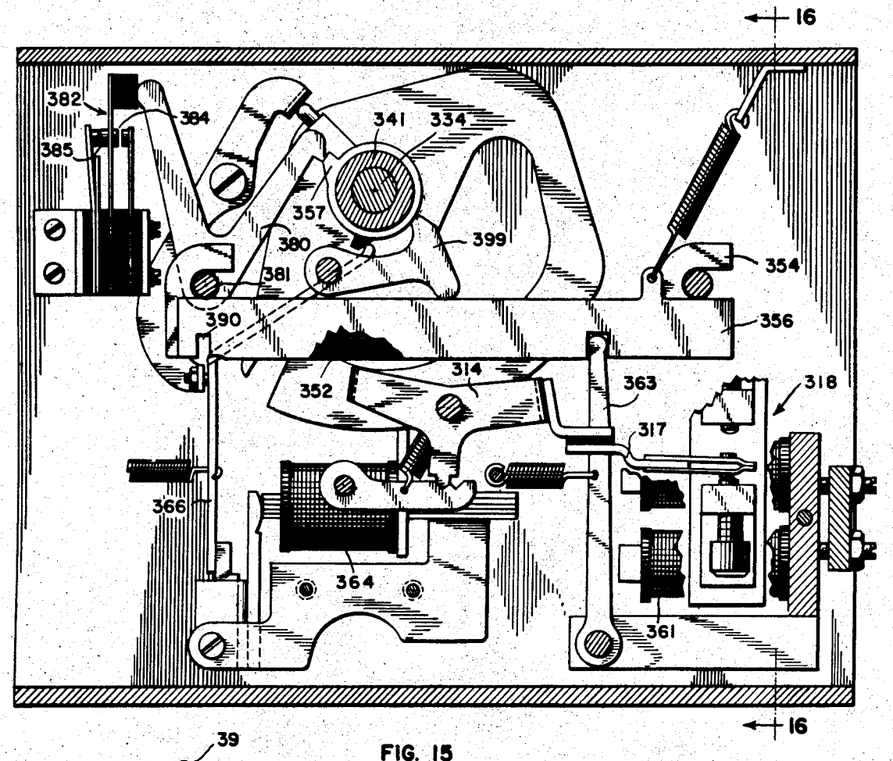
Fig. 15 is a front elevational view of a modification of the invention.
Figure 16:
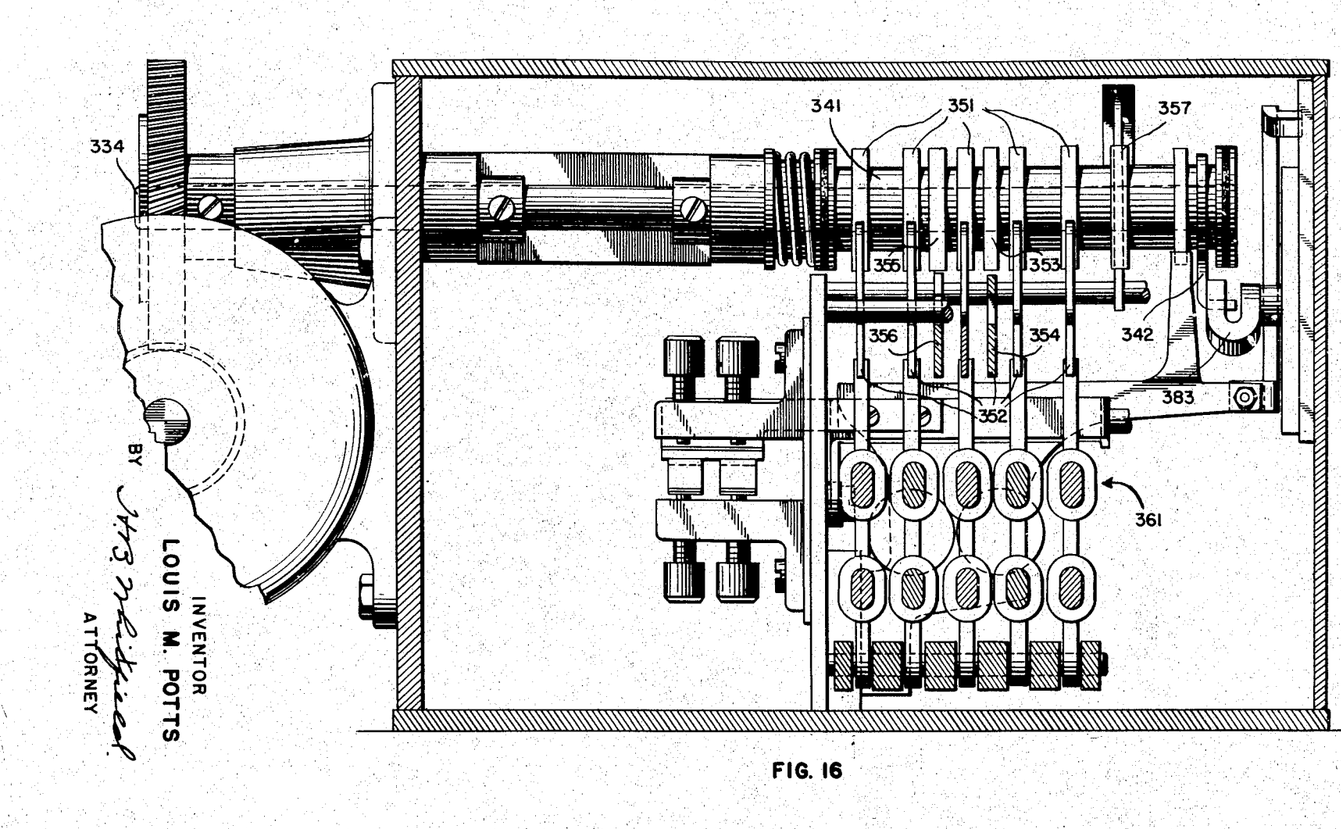
Fig. 16 is an end elevational view of the modification shown in Fig. 15.
Figure 17:
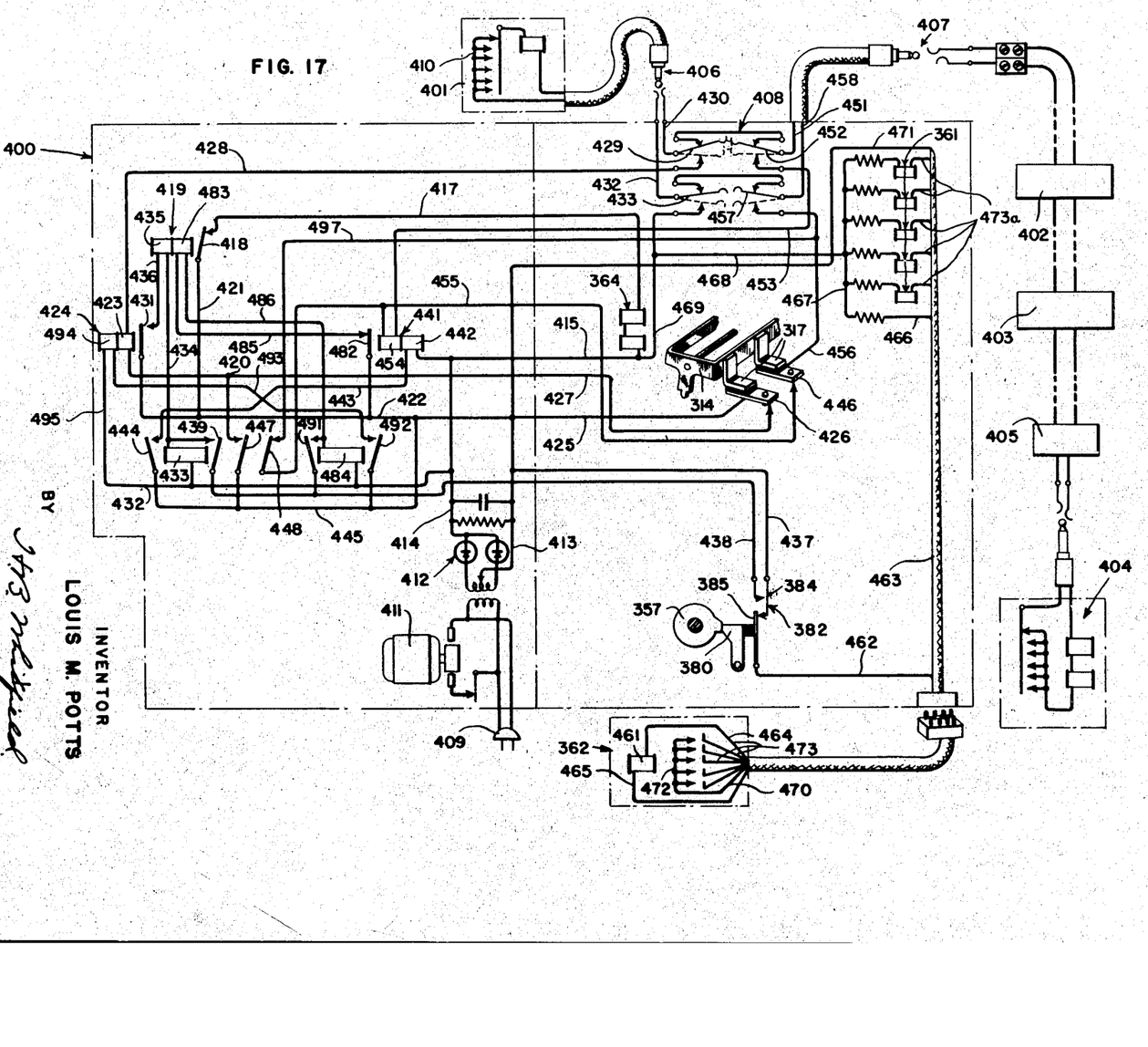
Fig. 17 is a circuit diagram for use with the modified form of the invention.

A modification of the invention is shown in Figs. 15, 16, and 17, which will now be described in detail. This modification features the use of code magnets in place of the tape sensing levers employed in the first described embodiment of the invention and also the use of a transmitting contact member having a pair of contact arms, only one of which is effective at a time dependent upon the direction of transmission.

Since in the modification of the invention the tape sensing levers for shifting the code bars have been omitted, a second cam sleeve is unnecessary for the sensing and tape stepping functions. In the modification, the direction switch bar has also been omitted and switching is now performed by means of a relay system.

It is felt unnecessary to describe again portions of the instant embodiment of the invention which are the same as the first embodiment and therefore such portions will be described only where necessary for the sake of clarity. Referring now to the drawings, 334 represents a continually driven shaft comparable with shaft 34 described in the first embodiment of the invention. The release of a sleeve 341 is accomplished by a selector magnet 364 and clutch mechanism such as has already been described, except that the release of the sleeve 341 is accomplished solely by the selector magnet 364 in view of the fact that in this embodiment of the invention, the start magnet has been dispensed with. Sleeve 341 is released by the operation of gate latch 383 which acts upon the stop arm 342 integrally associated with the cam sleeve 341. Cam sleeve 341 carries a series of five transmitting cams 351 which are sequentially operable to control a series of five transmitting code bars 352. Cam sleeve 341 also carries a start cam 353 for controlling the start bar 354, a cam 355 for controlling the stop bar 356 and a contact operating cam 357, the purpose of which will hereinafter appear.

As already mentioned, whereas in the first embodiment of the invention the code bars were shifted to the left or to the right under the control of tape sensing levers, the code bars are now similarly controlled by a set of code magnets 361 which may be operated from a key tape transmitter 362 (Fig. 17). In response to signals from the key tape transmitter 362, armature levers 363 associated with respective code magnets 361 are moved to the left or right as viewed in Fig. 15 to enable their associated code bars 352 to assume similar positions. Similarly, selector magnet 364 positions the armature lever 366 to the left or right as pictured in the same view to cooperate with the notch 390 in each code bar to enable the code bars to tilt to a counterclockwise or clockwise position as has already been described in connection with Fig. 1. This tilting operation is provided by the operation of the transmitting code cams, which sequentially operate associated T-shaped operating levers 399. A Y-shaped lever 314 is moved to its marking or spacing position under the combined influence of signals received by the selector magnet 364 and by the code magnets 361, to operate the pair of contact arms 317 to their marking or spacing position, to control the signal contact mechanism 318. As indicated in Fig. 17, the contact mechanism 318 comprises two sets of retransmitting or repeater contacts 426 and 446, one set being associated with each of the pair of arms 317. The contacts 426 are effective when signals are incoming from a remote station 404 (Fig. 17) through the ciphering unit 400 to the local station 401, and contacts 446 are effective when signals are outgoing from local station 401 through the ciphering unit 400 to the remote station 404. Just before the end of each revolution of cam sleeve 341, contact cam 357 will move the bell crank lever 380 in a counterclockwise direction about its pivot 381 (as viewed in Fig. 15) to operate the make-before-break contact 382 for a purpose which will hereinafter appear, which position is maintained during the rest or stop period.

It will be understood that, as signals are received by the selector magnet 364, a start impulse will precede each code combination to cause the release of the cam sleeve 341. This causes the start cam 353 to operate the start bar 354 for sending a start or no-current impulse by means of the contact operating arm 317. Immediately thereafter, the five code combination impulses will be transmitted under the control of the code bars 352 associated with their respective code bar cams 351. At the termination of the transmission of the code combination stop cam 355 operates to position code bar 356 to control the contact operating arm 317 to its marking or current position. As already mentioned, the first embodiment of the invention may be consulted for detailed operations which are similar in Figs. 15, 16, and 17, and which therefore have not been repeated in the present description.

Referring now particularly to Fig. 17, the circuit for operating the modified form of scrambling unit will be described in detail. A local station 401 is equipped with a combination keyboard transmitter and printer of any well-known type, which is designed to communicate by means of central offices or exchanges 402 and 403 with a similarly equipped distant station indicated at 404, which is provided with a ciphering unit 405, identical in construction with the ciphering unit employed in the modified form of the invention. When it is desired to attach the ciphering unit to any standard telegraph printing station, plug and jack connections may be made at 406 and 407 which will connect the local station 401 to a switch 408 and similarly connect the loop from the exchange 402 to the same switch at the plug connection 407. When switch 408 is positioned to its up position, signals may be transmitted directly from station 401 to the central office 402 without any enciphering operation taking place. However, when it is desired to encipher the signals, the switch 408 may be manually positioned to its downward position and for the purposes of the present description, it will be presumed that the switch has assumed such a position. In addition the ciphering unit will be provided with a plug 409 which may connect with any convenient alternating current outlet to provide the current to a motor 411. The unit will be further equipped with a rectifier indicated generally at 412 which will provide positive current over conductor 413, and negative current over conductor 414, as is well known in rectifying circuits of this type.

It will be presumed for the first portion of the present description, that the local station 401 desires to transmit enciphered messages to the remote station 404. Normally, the selector magnet 364 in the rest condition of the apparatus is energized, as is common practice in start-stop telegraphy, over the following circuit: From negative conductor 414, over conductor 415, through selector magnet 364, over conductor 417, through tongue 418 of receiving relay 419 (now de-energized), over conductor 421, and over conductor 422 to positive conductor 413. When the apparatus at the local station 401 is in its rest position, winding 423 of the double wound repeating relay 424 is energized over the following circuit: From positive conductor 413, over conductor 425, through contact 426, over conductor 427, through winding 423 of relay 424, over conductor 428, through tongue 429 of switch 408 (now in its down position), over conductor 430, through the printer apparatus at station 401, over conductor 432, tongue 433 (in its down position), and over conductors 469 and 415, to the negative conductor 414.

When, therefore, local station 401 transmits the start impulse, the just described circuit is broken at the transmitting contacts 410 at the local station 401, in a well-known manner, causing contact tongue 431 associated with the double wound relay 424 to be released. When this occurs, the following circuits are established: From negative lead 414, over conductor 432, through relay 433, (which now becomes energized), over conductor 434, through winding 435 of the double wound relay 419, over conductor 436, through contact tongue 431 (now released) of relay 424, and over conductor 422 to the positive lead 413. Thus, at this time both relay 433 and relay 419 become energized. When relay 419 becomes energized, tongue 418 associated therewith is attracted and consequently the previously described circuit to the selector magnet 364 is broken, causing the release of the cam sleeve 341 for a cycle of operations, in a manner which is well-known in start-stop telegraphy. When relay 433 operates, it locks up over the following circuit, since as cam 357 commences to rotate, the make-before-break contact 382 is permitted to operate to close its contact 384 and open its contact 385 to enable the establishment of the just mentioned locking circuit of relay 433: From positive conductor 413, over conductor 437, through contact 384 (now closed), over conductor 438, through tongue 439 of relay 433, through the winding of relay 433 and over the conductor 432 to the negative lead 414. In addition the double wound repeating relay 441 is locked up over the following circuit in order to prevent the repetition of signals back into the originating circuit when outgoing signals are being transmitted (sometimes called echo suppression): From negative potential lead 414, through the right-hand locking winding of repeating relay 441, over conductor 443, through tongue 444 of relay 443 (now closed), over conductor 445, over conductor 422, to positive lead 413. Since the winding 454 of repeating relay 441 is in the same circuit with contacts 446, and if relay 441 was not thus locked-up, said relay would be operated in consonance with the vibrations of contact 446, thus operating its armature 482 to disturb the control of selector magnet 364 by repeating relay 424. In a similar manner, the repeating relay 424 will be locked up in a circuit to be described later, in order to prevent the repeating relay 424 from sending signals back into the originating circuit while incoming signals are being received from a remote station.

At this time, contact 426 is rendered ineffective for transmission and conversely, contact 446 is conditioned for operation in the following manner: The afore-described energizing circuit for the double-wound repeating relay 424 is provided with a shunt or by-pass to positive battery 413 at junction 420 on conductor 427, so that after the first start impulse has become effective, the contacts 426 will be shunted. This shunt circuit extends from junction 420 over armature 447 (when attracted as previously described), over conductors 445 and 422 to positive source 413. It is therefore found that when contact arms 317 move to their marking positions, the closure of contact 426 will be ineffective, so as not to interfere with the outgoing signals, inasmuch as the circuit to contacts 426 has now been shunted out of the transmitting circuit. Transmitting contact 446 is rendered effective for transmission at this time since its shunt circuit (hereinafter described), which is normally closed, is now opened, inasmuch as contact tongue 448 of relay 433 is attracted to open the shunt circuit for said transmitting contact so that signals may be repeated thereby to the distant station. Normally the shunt circuit for contact 446 is as follows: Over lead 455, through closed contact 448 of unoperated relay 433, and over lead or conductor 427.

It is assumed that signals from station 401 are being repeated by the repeating relay 424 which, by opening and closing its contacts 431 causes the signals to be repeated again by the energization and de-energization of the winding 435 of the double-wound relay 419. Therefore, selector magnet 364 will be similarly conditioned so that its armature lever 366 cooperates with the armature levers 363 of the code magnets 361 to control the Y-shaped transmitting lever 314. The central office 402 will transmit signals to station 404 as its loop circuit extends through the contact 446. Thus the loop circuit is conditioned to receive marking and spacing impulses according to the operation of the Y-shaped lever 314. This circuit is as follows: From conductor 451, through tongue 452 of switch 408, over the conductor 453, through the winding 454 of double-wound repeating relay 441, over conductor 455, to the contact 446, over conductor 456, through tongue 457 of switch 408 to the loop conductor 458 which leads to the central office identified as 402. It will be understood that at the end of each cycle of operation the make-before-break contact 382 will operate to open the locking circuit extending over conductors 437 and 438 to the relay 433 so that the circuit will be returned to its normal condition.

The operation of cam 357 at the termination of each cycle of operation, through the operation of contact 382, causes the energization of stepping magnet 461 which steps the key tape at the key transmitter 362 to a new operating position. This circuit is as follows: From positive conductor 413, over conductor 437, through contact 385, over conductor 462 associated with cable 463, over conductor 464, through stepping magnet 461, over conductor 465, over conductor 466, over conductors 467, 468 and 469, then over conductor 415 to the negative lead wire 414. Therefore, during each cycle of operation stepping magnet 461 will operate to step the tape to a new position.

The code magnets 361 which are controlled by the key tape transmitter 362 are controlled by the now to be described circuit. From positive lead 413, over the conductor 471, and over conductor 470 to the key tape bus bar 472, which is in this manner normally provided with positive potential. Thus, when a tape feeler in the tape transmitter 362 senses a perforation, a circuit will be established to its respective code magnets as follows: From positive bus bar 472, over the particular conductor 473 associated with the particular feeler pin, over conductor 473a, thence through the associated code magnet 361 to conductor 467 which acts as a negative bus bar over the following circuit: Over conductor 468, over conductor 469, and then over conductor 415 to negative lead 414. Therefore, according to the marking and spacing conditions of the key tape associated with the key transmitter 362 code magnets 473 will be energized under marking conditions and de-energized under spacing conditions.

The circuit will now be described in connection with the receipt of signals from the outlying or remote stations 404 which are enciphered by means of the ciphering unit 405 and then transmitted through central offices 403 and 402 to the local station 401. At this time the circuit to the normally energized repeating relay 441, which is similar to the normally energized repeating relay 424, is broken upon the receipt of a start or spacing impulse from the remote station 404. This initiates a cycle of operation by the release of cam sleeve 341, as has been previously described in detail. The circuit extending to the repeating relay 441 is as follows: From source of potential at central office 402, over conductor 458, through contact 457 of switch 408, over conductor 456, through contact 446, over conductor 455, through operating winding 454 of the double-wound repeating relay 441, over conductor 453, through tongue 452 of switch 408, over conductor 451 to the other source potential at the central office 402. At this time, when the start impulse is transmitted from the remote station 404, relay 441 will become de-energized and its tongue 482 will be released to establish a circuit for relay 419 and relay 484 as follows: From positive lead 413, over conductor 422 through tongue 482 of repeating relay 441, over conductor 485, through the winding 483 of relay 419, over conductor 486, through the winding of relay 484, over conductor 432 to the negative lead 414. When relay 484 becomes energized, it is locked up as cam 357 operates to close the contact 384 as follows: From positive lead 413, over conductor 437, through contact 384, over conductor 438, through tongue 491, through the winding of relay 484, over conductor 432 to negative lead 414. Operation of relay 484 also causes the locking up of the repeating relay 424 to prevent this relay operating at this time in order that its contact tongue 431 may not interfere with signals in the circuit. This circuit is as follows: From positive lead 413, over conductor 422, over conductor 445, to contact tongue 492 of relay 484, over conductor 493, through the locking winding 494 of relay 424, over the conductor 495, and over the conductor 432 to the negative conductor 414.

After the first start impulse has become effective, transmitting contact 446 is bridged over the following shunt circuit already described above: Over conductor 455, through contact 448 of relay 433 (inasmuch as relay 433 is now de-energized), then over conductor 497. It is thus apparent at this time that the operation of contact 446 thereafter will produce no harmful result in the circuit in view of the shunt circuit provided therefor. Contact 426, however, is now free to operate, due to the fact that contact 447 of relay 433 is now open and the previously described circuit does not shunt out the contact 426.

Therefore, a circuit is made to repeat deciphered signals to the local printer 401 as follows: From positive lead 413, over conductor 425, through contact 426 (now operating), over conductor 427, through winding 423 of relay 424 (now locked), over conductor 428, through tongue 429 of switch 408, over conductor 430, through the printer at station 401, and on a return path over conductor 432, through tongue 433, over conductor 469 and over conductor 415 to the negative source of potential 414. It is further apparent at this time that selector magnet 364 will be operated according to incoming enciphered signals received from remote station 404 as relay 441 operates its tongue 482 and causes the operation of the double-wound repeating relay 419, which by its contact tongue 418 repeats the incoming signals to the selector magnet 364. As has already been mentioned, when cam 357 reaches its stop position the relay circuits are broken and the system is conditioned for reception in either direction.

The device according to the present invention, of course, has many applications. Illustrative of one adaptation of the portable ciphering unit described herein, said unit may be readily carried about and attached to any printing telegraph substation equipment and the party may be able to communicate secretly with any other substation having a similar unit attached. After the unit is plugged in and the switch operated to the plain message position, communication may be established to the desired station by transmitting plain English to the central office or exchange as is now done in normal practice. When the desired station is connected and a similar unit has been attached at the called station, the two cipher key mechanisms or units are set in exact correspondence either according to a special code sent at the time or according to prior information received by independent means, or by a prearranged schedule. When the settings have been verified, the switch at each station is operated to the ciphering position and enciphered transmission may proceed.

It will be understood that various changes and modifications may be made in the present invention without departing from the spirit and scope thereof, and the invention should accordingly be limited only by the appended claims.

What is claimed is:

1. In a regenerative repeater, a start magnet, a selector magnet, means to start the repeater at the beginning of a signal in response to the operation of the start magnet, a contact mechanism, means to control the contact mechanism by the selecting magnet only, two signal circuits connected to the repeater, and means responsive to a signal initiated in either circuit to start the repeater units operating, and means responsive to the initiating impulse to connect the selector magnet in the circuit initiating the impulse and the start magnet in the other circuit.

2. In a telegraph system, a signal selecting device, a cam sleeve started into rotation at the beginning of each signal and stopped at the end of each signal, a plurality of circuits any one of which may receive controlling signals, a similar plurality of magnets, all of said magnets adapted to start the cam sleeve in motion, only one of said magnets being adapted to selectively control the device, and means to invariably connect the selecting magnet in the circuit which receives the initiating signal.

LOUIS M. POTTS.